United States Patent
Bauer

(10) Patent No.: US 10,464,757 B2
(45) Date of Patent: Nov. 5, 2019

(54) SPROCKET DRIVEN CONVEYOR BELT LINK AND CONVEYOR BELT ASSEMBLY

(71) Applicant: PRINCE CASTLE LLC, Carol Stream, IL (US)

(72) Inventor: Richard Bauer, Palatine, IL (US)

(73) Assignee: PRINCE CASTLE LLC, Carol Stream, IL (US)

( * ) Notice: Subject to any disclaimer, the term of this patent is extended or adjusted under 35 U.S.C. 154(b) by 563 days.

(21) Appl. No.: 14/986,497

(22) Filed: Dec. 31, 2015

(65) Prior Publication Data

US 2016/0185529 A1 Jun. 30, 2016

Related U.S. Application Data

(60) Provisional application No. 62/099,109, filed on Dec. 31, 2014.

(51) Int. Cl.
| | |
|---|---|
| *B65G 17/40* | (2006.01) |
| *A47J 37/04* | (2006.01) |
| *B65G 23/06* | (2006.01) |
| *A21B 1/42* | (2006.01) |

(52) U.S. Cl.
CPC ............ *B65G 17/40* (2013.01); *A47J 37/044* (2013.01); *B65G 23/06* (2013.01)

(58) Field of Classification Search
CPC ........ B65G 23/06; B65G 17/40; B65G 17/08; A21B 1/48; A47J 37/044
USPC ............ 219/388; 198/844.1, 844.2, 849–853
See application file for complete search history.

(56) References Cited

U.S. PATENT DOCUMENTS

| | | | |
|---|---|---|---|
| 2,987,167 A | 6/1961 | Franz | |
| 3,680,927 A * | 8/1972 | Neureuther | B23Q 11/085 16/267 |
| 4,394,901 A | 7/1983 | Roinestad | |
| 4,473,365 A | 9/1984 | Lapeyre | |
| 5,307,923 A | 5/1994 | Damkjaer | |
| 5,316,133 A * | 5/1994 | Moser | B60P 1/38 198/750.1 |
| 6,223,889 B1 | 5/2001 | Layne et al. | |
| 6,581,758 B1 | 6/2003 | Van-Zijderveld et al. | |
| 6,918,486 B2 | 7/2005 | Shibayama et al. | |
| 7,278,535 B2 | 10/2007 | Damkjaer | |

(Continued)

FOREIGN PATENT DOCUMENTS

JP H06-141985 A 5/1994

*Primary Examiner* — Dana Ross
*Assistant Examiner* — James F Sims, III
(74) *Attorney, Agent, or Firm* — Marshall, Gerstein & Borun LLP

(57) ABSTRACT

A conveyor belt link that can form a substantially flat, continuous conveyor belt surface when coupled with multiple, identical conveyor belt links. In one embodiment, the conveyor belt link for a conveyor belt assembly comprises a base for carrying an item, the base having a first end, a second end, a first linking member projecting from the base, and a second linking member projecting from the base. The first end of the base terminates at a first angle (relative to a horizontal axis), the second end terminates at a second angle (relative to the horizontal axis), and the first and second angles of the ends are substantially supplementary. The first linking member comprises one of a cylinder and a channel and the second linking member comprises the other of the cylinder and the channel.

20 Claims, 7 Drawing Sheets

(56) References Cited

U.S. PATENT DOCUMENTS

| | | | |
|---|---|---|---|
| 7,314,132 B2 | 1/2008 | Layne et al. | |
| 7,419,051 B2 | 9/2008 | Damkjaer | |
| 7,530,455 B2 | 5/2009 | Lucchi | |
| 7,708,135 B2 | 5/2010 | Ellerth et al. | |
| 7,721,877 B2 | 5/2010 | Maine, Jr. et al. | |
| 7,800,023 B2 | 9/2010 | Burtea et al. | |
| 7,878,323 B2 | 2/2011 | Van Rees et al. | |
| 7,975,840 B2 | 7/2011 | Messick, Jr. et al. | |
| 7,987,972 B2 | 8/2011 | Hennigar et al. | |
| 8,113,340 B1 | 2/2012 | Smith et al. | |
| 8,499,928 B1 | 8/2013 | Liao et al. | |
| 8,506,687 B2 | 8/2013 | Jones | |
| 8,752,698 B2 | 6/2014 | Lasecki et al. | |
| 8,863,944 B2 | 10/2014 | MacLachlan | |
| 8,939,279 B2 | 1/2015 | Porter et al. | |
| 9,073,694 B2 | 7/2015 | Ozaki | |
| 9,221,611 B2 | 12/2015 | Ulchak et al. | |
| 2010/0143557 A1* | 6/2010 | Chung | A47J 37/044 426/466 |
| 2010/0275789 A1 | 11/2010 | Lee et al. | |
| 2015/0129395 A1 | 5/2015 | Messick, Jr. | |
| 2015/0151919 A1 | 6/2015 | Messick, Jr. et al. | |
| 2015/0191312 A1 | 7/2015 | Ulchak et al. | |
| 2016/0185529 A1 | 6/2016 | Bauer | |
| 2016/0185530 A1 | 6/2016 | Malkowski et al. | |

\* cited by examiner

SPROCKET DRIVEN CONVEYOR BELT LINK AND CONVEYOR BELT ASSEMBLY

CROSS REFERENCE TO RELATED APPLICATION

The benefit under 35 U.S.C. § 119(e) of U.S. provisional patent application Ser. No. 62/099,109, filed Dec. 31, 2014, the entire disclosure of which is incorporated herein by reference, is hereby claimed.

FIELD OF THE INVENTION

The present invention is directed to a conveyor belt link and a sprocket driven conveyor belt comprising the same. In particular, it relates to a conveyor belt link that provides a flat and continuous conveyor belt surface, minimizes costs, and simplifies manufacturing and assembly of a conveyor belt comprising the same.

BACKGROUND OF THE INVENTION

Conveyor belts have been known for many years, and are commonly used in many different fields of technology. Conveyor belts convey different items for cooling, drying, coating, cooking, and many other applications. Different types of conveyor belts include mesh belts, balanced weave belts, and wire belts.

Wire conveyor belts provide a more simple design than mesh and balanced weave belts. Wire conveyor belts are used for material handling, cooking, icing, slicing, breading, cooling, filling, inspecting, and packing of products like breads, rolls, buns, donuts, confections, cakes, pies, pastries, meat, seafood, poultry, and various processed products. They are also excellent for light-duty applications in metalworking and other industries. The open design of a conventional wire conveyor belt provides efficient operation with minimum maintenance and easy cleanup to meet sanitation requirements. A wire conveyor belt generally comprises a plurality of spaced metal rods interconnected by a plurality of "knuckle" connection elements formed at the rod ends. Some wire conveyor belts have sheet metal slats attached to the rods, for example, the wire conveyor belt disclosed in U.S. Pat. No. 7,987,972, which is herein incorporated by reference in its entirety.

Wire conveyor belts, however, often create a number of problems in the food industry in particular. It has been found, for example, that in some instances the rods of a wire conveyor belt can leave a mark on a food product that "runs" on top of the belt. The markings may become even more prominent if the product is heated while it is on the belt, if the product is put under pressure, or if the product being conveyed is naturally soft or pliable. Since product appearance is important for gaining consumer acceptance, particularly when food products are involved, the resulting markings can be a barrier to the use of a wire conveyor belt to carry certain products. The rods of the wire conveyor belts are also smooth and do not substantially grip or retain items that have smooth or slippery surfaces. Additionally, the components of the aforementioned wire conveyor belts, e.g., metal rods, knuckle connection elements, and metal slats affixed to the metal rods, require multiple manufacturing technologies. The manufacturing of multiple, different components as well as assembling the multiple components of the conveyor belt adds to the overall cost and complication of wire conveyor belt production. Accordingly, there exists a need in the marketplace for a conveyor belt that is simple to manufacture and assemble and can grip items with smooth or slippery surfaces without leaving marks on food products.

SUMMARY OF THE INVENTION

The following application discloses a conveyor belt link that can form a substantially flat, continuous conveyor belt surface when coupled with multiple, identical conveyor belt links.

In one embodiment, the conveyor belt link for a conveyor belt assembly comprises a base for carrying an item, the base having a first end, a second end, a first linking member projecting from the base, and a second linking member projecting from the base. The first end of the base terminates at a first angle (relative to a horizontal axis), the second end terminates at a second angle (relative to the horizontal axis), and the first and second angles of the ends are substantially supplementary. The first linking member comprises one of a cylinder and a channel and the second linking member comprises the other of the cylinder and the channel.

In one embodiment, a conveyor belt assembly comprises a conveyor belt having a plurality of interconnected conveyor belt links, each conveyor belt link having a base for carrying an item, the base having a first end, a second end, a first linking member projecting from the base, and a second linking member projecting from the base. The first end terminates at a first angle (relative to a horizontal axis), the second end terminates at a second angle (relative to the horizontal axis), and the first and second angles are substantially supplementary. The first linking member comprises one of a cylinder and a channel, and the second linking member comprises the other of the cylinder and the channel. Each conveyor belt link of the plurality of conveyor belt links is rotatably coupled to its adjacent conveyor belt links such that the cylinder linking member of each conveyor belt link is rotatably coupled to the channel linking member of its adjacent conveyor belt link.

In one embodiment, a food heating device comprises at least one platen for heating food products and at least one conveyor belt comprising a plurality of conveyor interconnected belt links. Each conveyor belt link comprises a base for carrying an item, the base having a first end a second end, a first linking member projecting from the base and second linking member projecting from the base. The first end of the base terminates at a first angle (relative to a horizontal axis), the second end terminates at a second angle (relative to a horizontal axis), and the first and second angles are substantially supplementary. The first linking member comprises one of a cylinder and a channel and the second linking member comprises the other of the cylinder and the channel, wherein each conveyor belt link of the plurality of conveyor belt links is rotatably coupled to its adjacent conveyor belt links such that the cylinder linking member of each conveyor belt link is rotatably coupled to the channel linking member of its adjacent conveyor belt link. The conveyor belt moves relative to the at least one platen and transports a food product to allow the food product to be exposed to the platen.

In one embodiment, a conveyor belt comprises a plurality of conveyor belt links, each conveyor belt link having a base for carrying an item, the base having a first end, a second end, a first linking member projecting from the base and a second linking member projecting from the base. The first end of the base of the conveyor belt link terminates at a first angle (relative to a horizontal axis), the second end terminates at a second angle (relative to a horizontal axis), and the first and second angles are substantially supplementary. The first end, which is undercut, provides a stop surface. An arm projecting downward from the base connects the base and the first linking member. The second end provides a rest surface, and connects the base and the second linking member. The first linking member is a cylinder and the second linking member is a channel, wherein each conveyor belt link of the plurality of conveyor belt links is rotatably coupled to its adjacent conveyor belt links such that the cylinder linking member of each conveyor belt link is rotatably coupled to the channel linking member of its adjacent conveyor belt link. The base has a top receiving surface for carrying an item, wherein the top receiving surface is corrugated or textured for retaining the item.

BRIEF DESCRIPTION OF THE DRAWING FIGURES

DETAILED DESCRIPTION

Figure 1:
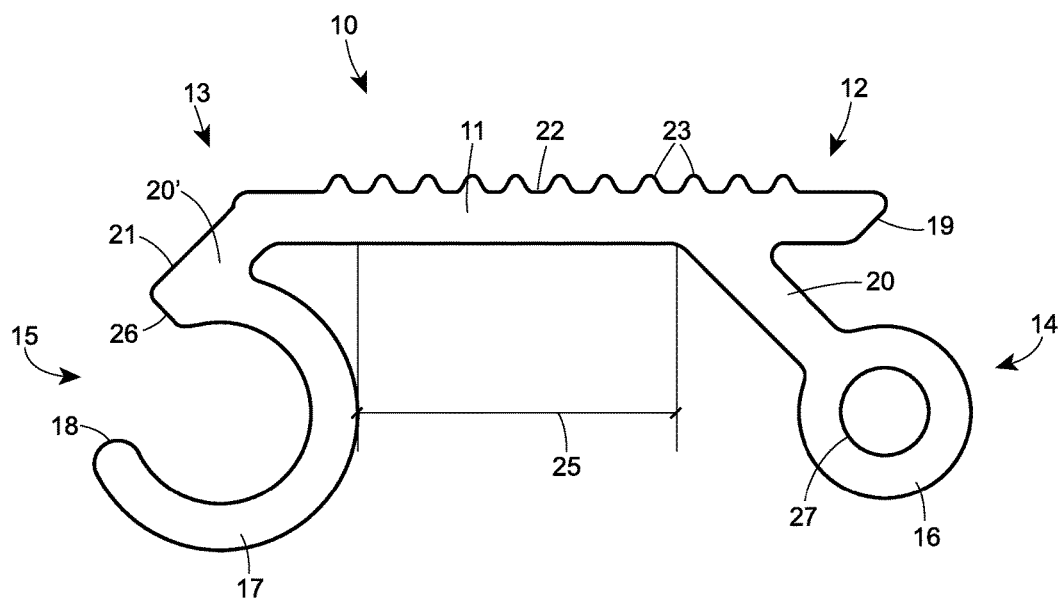
FIG. 1 is a side view of a first exemplary conveyor belt link.

A conveyor belt link that can form a continuous conveyor belt when coupled with multiple, identical conveyor belt links is disclosed. A conveyor belt 10 link according to the disclosure is illustrated generally in FIG. 1, and has a base 11 and, protruding from the base 11, first and second linking members 14, 15. First and second linking members 14, 15 are adapted to connect, or more specifically rotatably couple, to adjacent conveyor belt links. The base 11 has a top surface 22 for retaining and conveying an item and first and second ends 12, 13 angled to mate with the respective second and first ends of adjacent conveyor belt links. The first end 12 terminates at a first angle, and the second end 13 terminates at a second angle, such that the first and second angles are substantially supplementary. As used herein, the term "substantially supplementary" refers to a summation of two angles that approaches 180°, the summation typically being within ±10°, within ±5°, and/or within ±2° of 180°.

In one preferred embodiment, the first end 12 is undercut such that the first angle is less than 90° and the undercut end 12 provides a stop surface 19. The second end 13 terminates at a second angle that is greater than 90° to provide a rest surface 21 of the second end 13. The second angle of the rest surface 21 is substantially supplementary to the first angle of the stop surface 19. In general, the stop surface 19 cooperates with the rest surface 21 of an adjacent interconnected link to prevent significant undesired movement of interconnected links. By providing an undercut first end and a substantially supplementary surface on the second end, the conveyor belt is configured to facilitate desired rotational movement of interconnected links (for example, when a link is being driven by a sprocket along the perimeter of the sprocket) while simultaneously preventing significant undesired movement (for example, when adjacent interconnected links are providing a substantially flat and substantially continuous surface for carrying/transporting an item). As explained in further detail below, the substantially flat and continuous surface can be horizontal or vertical.

The conveyor belt link 10 can be manufactured from any suitable material, but is preferably formed from an extrudable material including, but not limited to, extrudable metals, extrudable polymers, and extrudable ceramics. Exemplary extrudable metals include, but are not limited to, aluminum, brass, copper, magnesium, and steel. Aluminum alloys such as hard coated anodized aluminum, for example AA 6063-T6, are preferred. Exemplary extrudable plastics include, but are not limited to, polyvinylchlorides, polyethylenes, polypropylenes, acetals, acrylics, nylons (polyamides), polystyrene, acrylonitrile butadiene styrenes, and polycarbonates.

In each embodiment, the conveyor belt link 10 is configured to carry items, such as food products, over a distance of a conveyor belt loop. As illustrated in FIG. 1, the base 11 of the conveyor belt link 10 has a top surface 22 that is corrugated or textured to grip an item during translational motion. The top surface 22 of the conveyor belt link 10 therefore includes gripping features 23 to retain the item while the item is transported. The gripping features 23 create friction between the conveyor belt link 10 and the item to be conveyed so that the conveyor belt link 10 retains contact with the item during conveyance. The gripping features 23 are typically integrally formed on the top surface 22 of the conveyor belt link 10 and take the shape of a series of parallel rows of sharp ridges and furrows. Of course, similar features can be added post-manufacturing and/or take other geometrical shapes to enhance friction between the top surface 22 and the item to be conveyed. The gripping features 23 allow the top surface 22 to grip on to any kind of surface the item may have, for example, a round or very smooth item that can easily move or slide while being transported. During translational motion, the gripping features 23 hold the item in place over a desired distance and the item does not slide off or move from the top surface 22 of the conveyor belt link 10 until reaching the end of the conveyor belt loop and being conveyed to a desired location for further use/operation. Again, as shown in FIG. 1, the gripping features 23 are integrally formed with the conveyor belt link 10, but the gripping features 23 may also be manufactured separately and then attached to the top surface 22 of the conveyor belt link 10. The gripping features 23 may be manufactured from the same or different material as the conveyor belt link 10. Alternatively, instead of a series of rows of ridges, the gripping features 23 may also be formed by a grid of textured pegs. A variety of other geometric shapes can also be used provided that the gripping features 23 enhance friction between the top surface 22 and the item to be conveyed.

FIG. 1 further illustrates a side view of the linking members 14, 15 of the conveyor belt link 10. As shown, the first and second linking members 14, 15 project from the first and second ends 12, 13, respectively, of the conveyor belt link 10. The first linking member 14 is connected to the base 11 by an arm 20 that projects downward from the base 11 at a third angle that may be the same or different from the first and second angles. Similarly, an arm 20' (which also provides the rest surface 21) connects the second linking member 15 and the base 11, forming a rest end 26 at the surface of the arm 20' distal from the base. The first linking member 14 of the conveyor belt link 10 in FIG. 1 is a cylinder member 16 and the second linking member 15 is a channel member 17. The channel member 17 is adapted to be rotatably coupled to the cylinder member 16 of an adjacent conveyor belt link 10. Specifically, the cylinder linking member 16 of a first link 10 may be slidably received by the channel linking member 17 of a second identical link 10. In one embodiment, the cylinder member 16 includes a bore 27 to receive a mounting screw 220 (FIG. 7) or similar fastener, as described further below. The first and second linking members 14, 15 are spaced apart by a gap 25, which has a specific, predetermined length/distance that will be described in more detail below.

In preferred embodiments, the first linking member of a first conveyor belt link is rotatably and releasably coupled to the second linking member of an adjacent conveyor belt link. As used herein, the term "rotatably coupled" refers to two elements that are coaxially aligned, i.e., two elements that share a common axis of rotation. As used herein, the term "releasably coupled" refers to two interconnected elements that can be decoupled from one another without causing damage or dysfunction to the respective elements.

Figure 2:
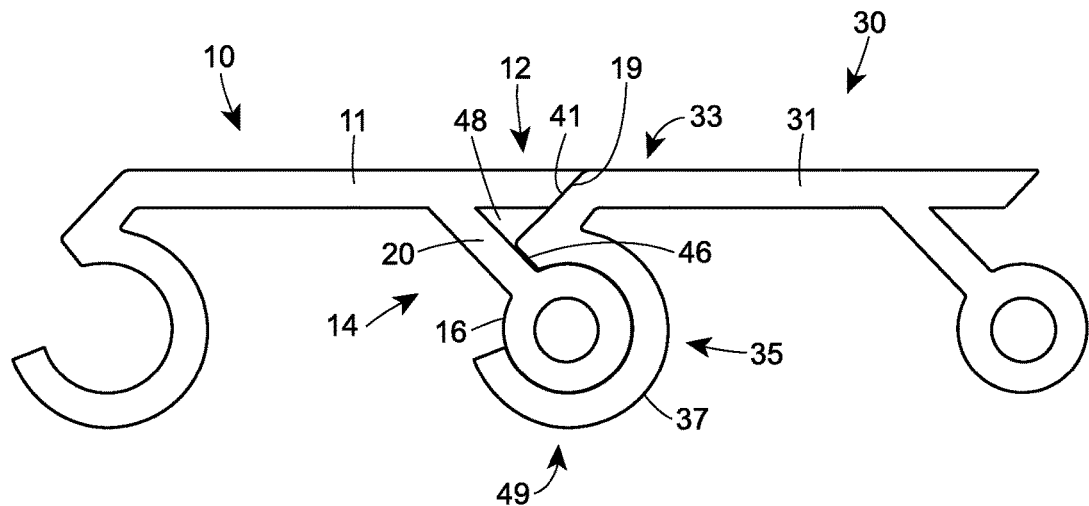
FIG. 2 is a side view of the conveyor belt link of FIG. 1 that is rotatably coupled to an identical, adjacent conveyor belt link.

FIG. 2 illustrates the conveyor belt link 10 of FIG. 1 coupled to a second, adjacent, identical conveyor belt link 30 to form a continuous surface and a coupling 49. The second conveyor belt link 30 is labeled with a different reference number than the first conveyor belt link 10 simply for clarity in this illustration; other components of the second conveyor link 30 are also labeled using different reference numbers than the corresponding components of the first conveyor link 10 for the same reason. The cylinder member 16 of the first linking member 14 of the first conveyor belt link 10 is coupled to a channel member 37 of a second linking member 35 of the second, adjacent conveyor belt link 30 by sliding/inserting the cylinder member 16 into the channel member 37 to create a coupling 49 interconnecting the two links 10, 30. The first linking member 14 of the conveyor belt link 10 and the second linking member 35 of the adjacent conveyor belt link 30 are therefore coaxially aligned at the coupling 49, i.e., the first linking member 14 and the second linking member 35 share a common axis of rotation when interconnected. As a result, the linking members can rotate at the coupling 49, but such motion is limited by motion limiting surfaces, as described in further detail below. A substantially flat, continuous surface suitable for conveying items forms when the cylinder member 16 is rotatably coupled to the channel member 37 and the stop surface 19 of the conveyor belt link 10 mates with a rest surface 41 of the adjacent conveyor belt link 30, so as to join the base 11 of the conveyor belt link 10 to a base 31 of the adjacent conveyor belt link 30. When the bases 11, 31 mate, a rest end 46 of the second/adjacent conveyor belt link 30 rests on or proximate to the arm 20 of the first conveyor belt link 10, which forms an enclosed chamber 48 between the first end 12 of the conveyor belt link 10 and a second end 33 of the adjacent conveyor belt link 30. The chamber 48, as discussed further below, provides an advantageous protective feature to the conveyor belt assembly, particularly when the conveyor belt assembly is used to transport food products.

Linking members of a conveyor belt link according to the invention may be configured differently than as illustrated in the conveyor belt links 10, 30 shown in FIGS. 1 and 2. The conveyor belt link 50, illustrated in FIG. 3, has a first linking member 54 and a second linking member 55 projecting from a base 51. The first linking member 54 projecting from a first end 52 includes a channel member 57 and the second linking member 55 projecting from a second end 53 includes a cylinder member 56. The channel member 57 of the first linking member 54 is oriented to receive a cylinder member 56 of an adjacent conveyor belt link 50. The cylinder member 56 is connected to the base 51 by an arm 60.

Figure 3:
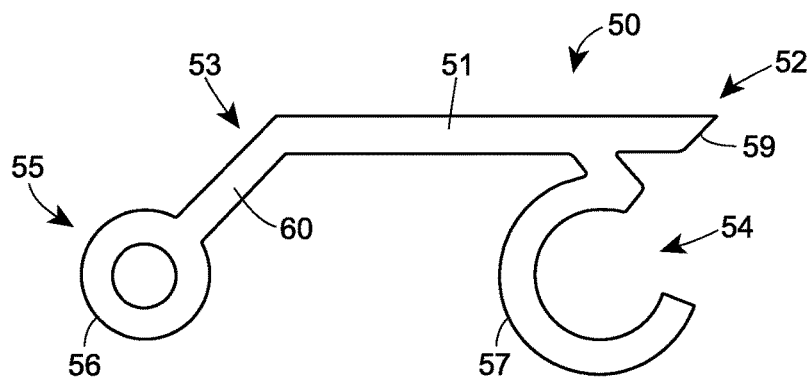
FIG. 3 is a side view of a second exemplary conveyor belt link.
Figure 4:
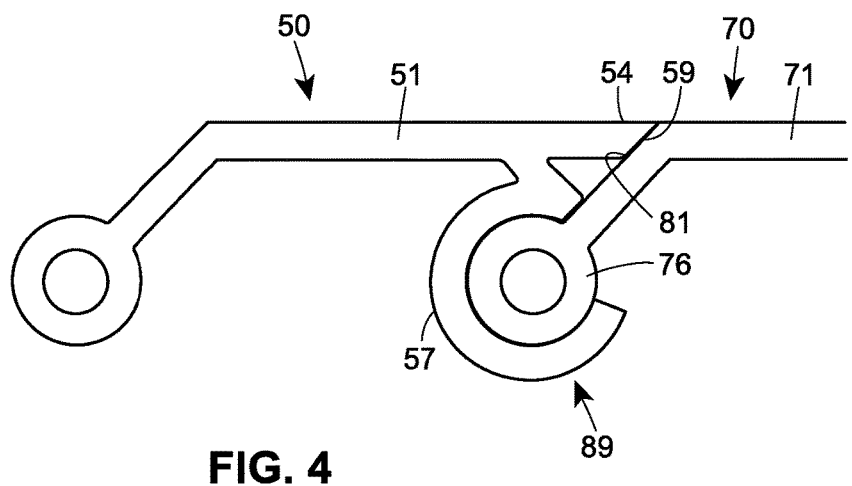
FIG. 4 is a side view of the conveyor belt link of FIG. 3 that is rotatably coupled to an identical, adjacent conveyor belt link.

Similar to the coupling 49 shown in FIG. 2, FIG. 4 illustrates the conveyor belt link 50 of FIG. 3 coupled to an adjacent, identical conveyor belt link 70. The channel member 57 of the conveyor belt link 50 is coaxially aligned with a cylinder member 76 of the adjacent conveyor belt link 70 to form a coupling 89, i.e., the channel member 57 and the cylinder member 76 share a common axis of rotation when interconnected. A substantially flat, substantially continuous surface suitable for conveying items is created when the cylinder member 76 is rotatably coupled to the channel member 57 and the stop surface 59 of the conveyor belt link 50 mates with a rest surface 81 of the adjacent conveyor belt link 70, so as to join the base 51 of the conveyor belt link 50 to a base 71 of the adjacent link 70. For simplicity, the following embodiments of a conveyor belt and a conveyor belt assembly refer to the conveyor belt link 10 and the conveyor belt link coupling 49 of FIGS. 1-2, but it should be understood that the conveyor belt link 50 and the conveyor belt link coupling 89 of FIGS. 3-4 may also be used.

Figure 5:
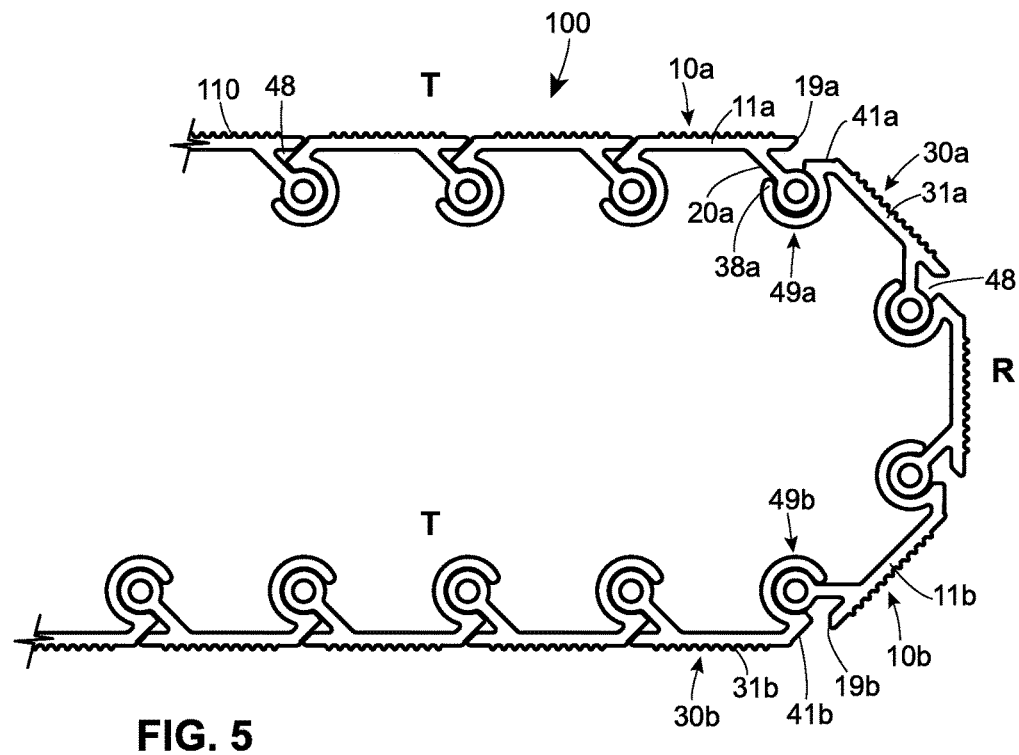
FIG. 5 is a side view of a partially assembled conveyor belt comprising multiple, interconnected conveyor belt links of FIG. 1, in which the conveyor belt links are rotatably coupled to adjacent links.

FIG. 5 is a side view of a conveyor belt 110 of a partial conveyor belt loop 100 comprising multiple, coupled (or interconnected) conveyor belt links 10. The conveyor belt 110 is formed by successively coupling the linking members 14, 15 of each conveyor belt link 10 with the linking members 14, 15, of adjacent links. Each conveyor belt link 10 of the conveyor belt 110 is rotatably coupled to its adjacent conveyor belt links. The partial conveyor belt loop 100 depicts the conveyor belt links 10 in a translational phase T and a rotational phase R. A complete conveyor loop has two translational phases T, both in the center of the loop 100, and two rotational phases R, at the ends of the loop 100. During the translational phases T, the base 11 of each conveyor belt link 10 mates with the base of its adjacent links to form a substantially flat, substantially continuous, and substantially even surface suitable for conveying items, described above and illustrated in FIG. 2.

At the rotational phase R, the mating surfaces of adjacent conveyor belt links, for example, the rest surface 41a of conveyor belt link 30a and the stop surface 19a of conveyor belt link 10a, separate as the adjacent conveyor belt link 30a rotates about a driving mechanism (see FIG. 6, reference no. 200), thereby disrupting the substantially flat, substantially continuous and substantially even surface of the conveyor belt 110. The conveyor belt links 10a, 30a are rotatably coupled at the coupling 49a, which allows the adjacent conveyor belt link 30a to rotate clockwise about the coaxis (not shown) of the coupling 49a. As illustrated in FIG. 5, this rotational motion is limited by motion limiting surfaces, including, for example, the stop surface 19a and the arm 20a of the conveyor belt link 10a and the channel member end 38a and the rest surface 41a of the adjacent conveyor belt link 30a. When the conveyor belt links 10a, 30a are in a first stage of rotation, the adjacent conveyor belt link 30a rotates clockwise about the coaxis of the coupling 49a, the rest 41a moves away from the stop 19a, and the bases 11a, 31a separate, thereby disrupting the continuous surface of the conveyor belt 110. The channel member end 38a of the adjacent conveyor belt link 30a (which leads the trailing conveyor link 10a and thus is further along in its rotation) abuts against the arm 20a of the conveyor belt link 10a, thereby limiting the adjacent conveyor belt link 30a from rotating further in the clockwise direction. When the conveyor belt links 10b, 30b are in a second stage of rotation, the adjacent conveyor belt link 30b has made a "complete 180° rotation" about the driving mechanism (not shown) such that conveyor belt link 30b is on its return path to the beginning belt section, i.e., to the point when items are added to the belt to be carried or conveyed. The bases 11b, 31b remain separate and the conveyor belt link 10b rotates clockwise about the axis of the coupling 49b. When rotation about the driving mechanism is complete for conveyor belt link 10b, the stop surface 19b of the conveyor belt link 10b mates with the rest surface 41b of the adjacent conveyor belt link 30b, thereby limiting the conveyor belt link 10b from rotating further in the clockwise direction. The stages of rotation, as described above, are not exhaustive and are only discussed here to describe the motion limiting surfaces of the conveyor belt link 10. A "complete 180° rotation" referenced herein is a rotation about the driving mechanism (see FIG. 6, reference no. 200) at one end of the conveyor belt loop 100 and thus does not refer to a complete loop around the conveyor belt loop 100, or a 360° rotation. Additionally, "clockwise" may be replaced with "counterclockwise" depending on perspective and thus the disclosure is not limited by "clockwise" rotation. Similarly, belts can be driven to run in a counterclockwise direction.

Figure 6:
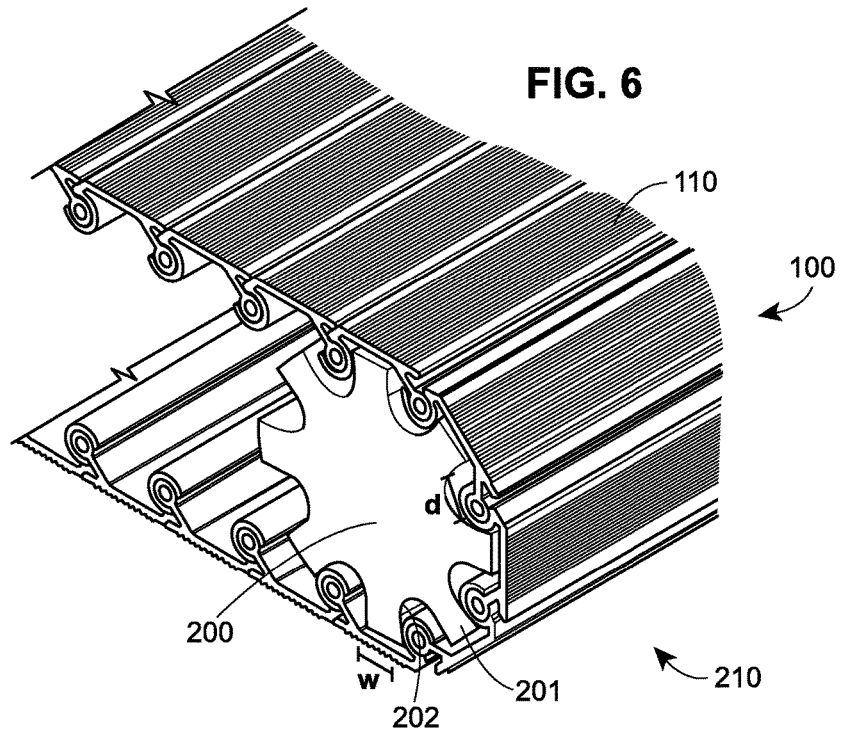
FIG. 6 is a perspective view of a partially assembled conveyor belt assembly including the conveyor belt of FIG. 5 and a driving mechanism.

FIG. 6 illustrates a perspective view of a partial conveyor belt assembly 210 having a sprocket 200 that drives the conveyor belt 110 of FIG. 5. The sprocket 200 has a plurality of teeth 201 and a plurality of furrows 202 between the teeth 201. Each tooth 201 has a width "w" that is less than the link gap 25 (see FIG. 1), which is a distance between an innermost point of the channel member 17, e.g., as shown in FIG. 1, the point at which the channel protrudes the greatest distance toward the cylinder member, and an innermost point of the cylinder member 16, e.g., as shown in FIG. 1, the point where the arm 20 connects to the base 11 of the conveyor belt link 10. Each furrow 202 has a width "d" greater than a greatest cross-sectional diameter of the channel member 17. To drive the conveyor belt 110, the sprocket 200 engages and drives the conveyor belt 110 into rotational and translational motion about the conveyor belt loop 100. The sprocket 200 rotates the conveyor belt 110, for example, when the teeth 201 engage the gaps 25 of the conveyor belt links 10 and/or when the couplings 49 engage the furrows 202. At the point of engagement, the sprocket 200 effectively drives the conveyor belt links into rotational motion and separates the mating surfaces of the adjacent conveyor belt links as described above.

Figure 7:
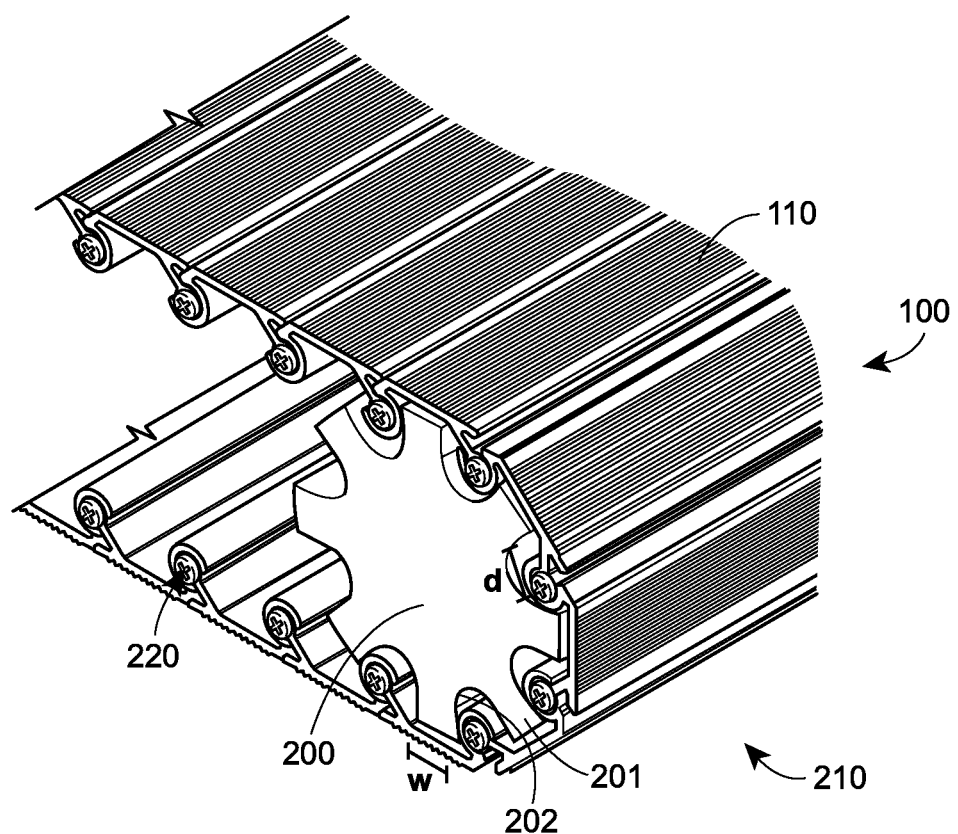
FIG. 7 is the conveyor belt assembly of FIG. 6 including mounting screws attached at each coupling to secure the conveyor belt links.

Referring to FIG. 7, the conveyor belt 110 may include a plurality of mounting screws 220 that secure the adjacent links 10. More specifically, the mounting screws 220 limit the axial movement of the linking members 14, 15 of adjacent links 10 at each coupling 49. As illustrated in FIG. 7, the mounting screw 220 can be threaded into a threaded bore 27 of the cylinder member 16 at the coupling 49. Of course, pins, rivets, and similar fasteners may be used to similar effect, without need for a threaded bore. The circumference of the head of the mounting screw 220 or similar fastener is greater than the circumference of the cylinder member 16, thereby abutting against the channel member 17 and limiting the axial movement or sliding of the links 10.

The stop 19 and rest 41 surfaces, described above, create a collecting chamber 48, which is a beneficial feature of the conveyor belt 110 according to the disclosure. As best shown in FIG. 2, the collecting chamber 48 is formed between the first and second ends 12, 33 of adjacent conveyor belt links 10, 30. Referring now to FIGS. 2 and 5, when the conveyor belt links are moving in the translational phase T, the arm 20 of the conveyor belt link 10, the rest surface 41 of the adjacent conveyor belt link 30, and the undercut end 12 of the conveyor belt link 10 enclose a space between the two, adjacent conveyor belt links 10, 30. The collecting chamber 48, or enclosed space, can trap and contain debris or food crumbs from an item while the item is transported. In a device including a horizontally-driven conveyor belt, such as the one illustrated in FIG. 6, the collecting chamber 48 catches and thus prevents debris and crumbs from falling into the driving mechanism 200 and the inside of the conveyor belt assembly 210 when the collecting chamber 48 is open. When a coupling 49 transitions from the translational phase T to the rotational phase R, the stop surface 19 of the conveyor belt link 10 and the rest surface 41 of the adjacent conveyor belt link 30 separate, thereby opening the chamber 48 and allowing collecting of debris from the items that have been carried by the belt. As the collecting chamber 48 rotates about the driving mechanism 200, the crumbs and debris fall out of the collecting chamber 48 and away from the conveyor belt assembly 210. The undercut feature of the stop surface 19 of the first end 12 and the substantially supplementary rest surface 41, as well as the other components that enclose and thereby provide the collection chamber 48, extend the life of the conveyor belt assembly 210 and minimize maintenance and cleaning of the conveyor belt assembly 210.

The dimensions of the conveyor belt link 10 vary according to application and use of the conveyor belt 110 as well as the size of the sprocket 200 that drives the conveyor belt assembly 210. The length of the base 11, as well as the dimensions of the linking members 14, 15 of the conveyor belt link 10, depend on the size of the sprocket 200 used to drive the conveyor assembly 210. Each tooth 201 of the sprocket 200 must fit between each gap 25 of the conveyor belt 110 and the tooth width w cannot be greater than the distance of the gap 25. Similarly, the coupling 49 must fit in the furrow 202, or the space between the teeth 201 of the sprocket 200, to reciprocally engage the conveyor belt 110. The distance between the outermost points of the coupling 49, which is also the largest cross-sectional diameter of the channel member 17, must be less than the furrow width d to properly engage the sprocket 200.

Figure 8:
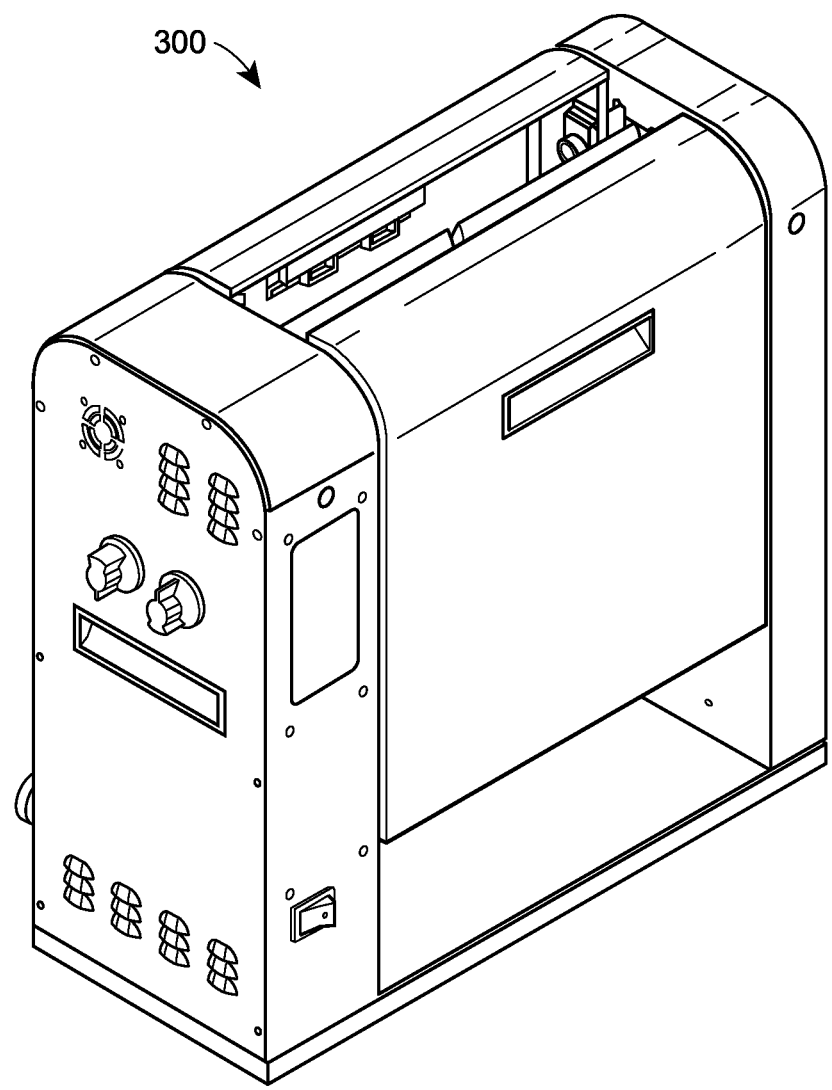
FIG. 8 is a perspective view of a conveyor toaster including two conveyor belt assemblies comprising conveyor belts of FIG. 5 and driving mechanisms.
Figure 9:
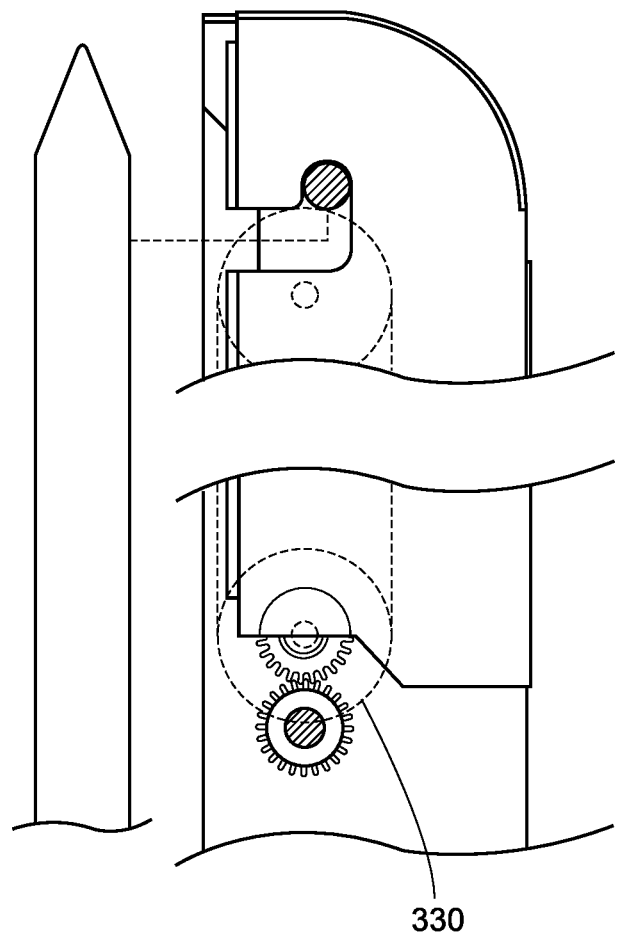
FIG. 9 is a partial cut-away view of the toaster of FIG. 8 illustrating an exemplary spatial relationship of a conveyor belt of FIG. 5 and a heated platen in the conveyor toaster.

In one embodiment, devices comprising the conveyor belt assembly according to the disclosure advantageously transport one or more food products in a direction, e.g. horizontally or vertically downward along a heated platen so as to expose the food products to the energy radiating from the platen. The conveyor belt assembly 210 can be used in many food heating devices, such as toasters, that require one or more conveyor belt assemblies 210. For example, the conveyor belt assembly 210 can be implemented in a vertically oriented food heating device. The vertical food heating device 300 of FIGS. 8-9 employs two conveyor belt assemblies 330, one of which is illustrated in FIG. 9. Otherwise, the vertical food heating device structure is generally known in the art, as shown for example in U.S. Pub. No. 2010/0275789, which is incorporated herein by reference in its entirety.

Figure 10:
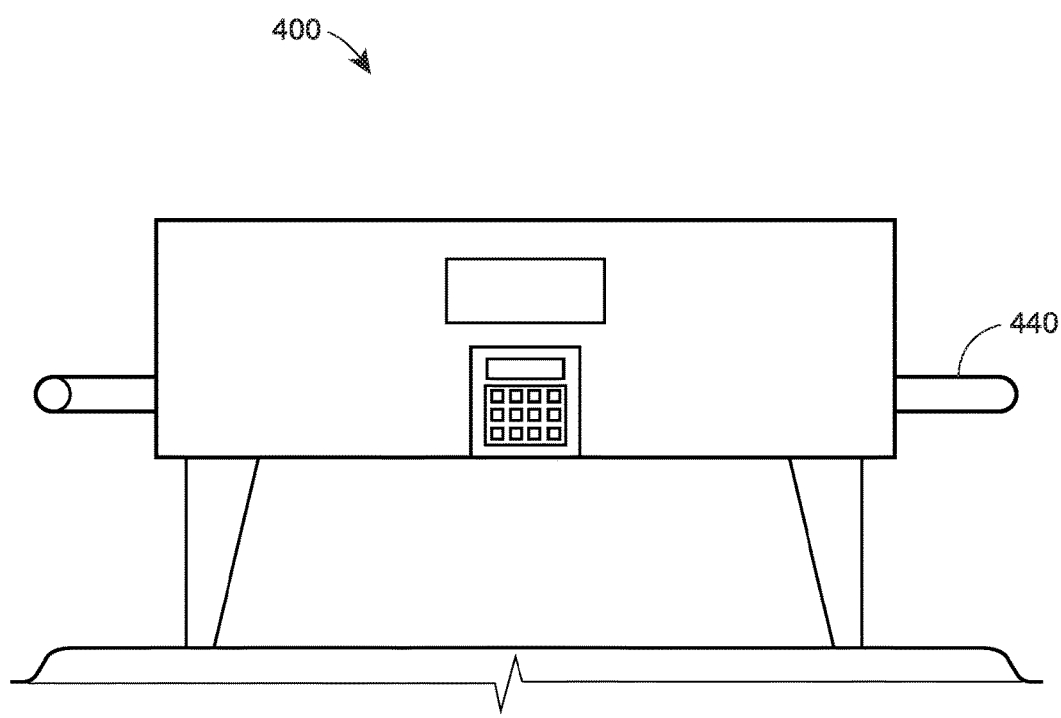
FIG. 10 is a perspective view of a horizontal conveyor oven including a conveyor belt assembly comprising the conveyor belt of FIG. 5 and a driving mechanism.

In an additional embodiment, devices comprising the conveyor belt assembly according to the disclosure can be implemented in a horizontally oriented food heating device. Referring now to FIG. 10, a horizontal food heating device 400, or toaster, includes the conveyor belt assembly 210 of FIG. 6. The horizontal toaster structure illustrated in FIG. 10 is disclosed in U.S. Pat. No. 7,800,023, which is incorporated herein by reference in its entirety. The horizontal toaster 400 includes at least one conveyor belt assembly 440. Of course, diagonal oriented devices and the like are also possible.

While the present invention has been described with respect to a particular embodiment of the present invention, this is by way of illustration for purposes of disclosure rather than to confine the invention to any specific arrangement as there are various alterations, changes, deviations, eliminations, substitutions, omissions, and departures which may be made in the particular embodiment shown and described without departing from the scope of the claims.

What is claimed is:

1. A conveyor belt link for a conveyor belt assembly, comprising:
    a base for carrying an item, the base having a first end and a second end, a first linking member attached to the base by a first arm that projects downward from the base at an angle and is offset from the first end, and a second linking member attached to the base by a second arm that projects downward from the base;
    the first end terminating at a first angle relative to a horizontal axis, the second end terminating at a second angle relative to the horizontal axis, the first and second angles being substantially supplementary; and
    the first linking member comprising a partial cylinder and the second linking member comprising a channel, the channel being adapted to rotatably couple with a first linking member of an adjacent conveyor belt link.

2. The conveyor belt link for a conveyor belt assembly according to claim 1, wherein the first end is undercut.

3. The conveyor belt link for a conveyor belt assembly according to claim 2, wherein the undercut of the first end provides a stop surface.

4. The conveyor belt link for a conveyor belt assembly according to claim 1, wherein the second end terminating at the second angle provides a rest surface, the rest surface comprising a surface inclined at the second angle, the inclined surface connecting the base and the second linking member.

5. The conveyor belt link for a conveyor belt assembly according to claim 1, the base for carrying an item having a top receiving surface for carrying an item, wherein the top receiving surface is corrugated or textured for retaining an item to be transported.

6. The conveyor belt link for a conveyor belt assembly according to claim 1, wherein the portion of the cylinder comprises a bore.

7. A conveyor belt assembly, comprising:
    a conveyor belt comprising a plurality of conveyor belt links, each conveyor belt link comprising a base for carrying an item, the base having a first end and a second end, a first linking member attached to the base by a first arm that projects downward from the base at an angle and is offset from the first end, and a second linking member attached to the base by a second arm that projects downward from the base;
    the first end terminating at a first angle relative to a horizontal axis, the second end terminating at a second angle relative to the horizontal axis, the first and second angles being substantially supplementary;
    the first linking member comprising a partial cylinder and the second linking member comprising a channel, wherein the channel is adapted to rotatably couple with a first linking member of an adjacent conveyor belt link;
    the base for carrying an item having a top receiving surface for carrying an item; and
    wherein the portion of the cylinder of the first conveyor belt link is rotatably coupled to the channel of the second conveyor belt link.

8. The conveyor belt assembly according to claim 7, wherein the first end is undercut and the undercut provides a stop surface, wherein the second end terminating at a second angle provides a rest surface, and wherein the rest surface of the first conveyor belt link mates with the stop surface of the second, adjacent conveyor belt link, the stop surface being adapted to partially limit rotational movement of coupled linking members.

9. The conveyor belt assembly according to claim 7, further comprising a sprocket having a plurality of teeth, each conveyor belt link configured to receive one of the plurality of teeth between the first and second linking members each tooth having a width less than the distance between the first and second linking members.

10. The conveyor belt assembly according to claim 7, wherein a flat continuous surface is provided by the top receiving surfaces of multiple, adjacent, coupled conveyor belt links of the plurality of conveyor belt links.

11. The conveyor belt assembly according to claim 7, wherein the portion of the cylinder includes a bore.

12. The conveyor belt assembly according to claim 11, further comprising a plurality of fasteners disposed in the bores of the portions of the cylinder.

13. A food heating device comprising:
    at least one platen for heating food products;
    a conveyor belt comprising a plurality of conveyor belt links;
    each conveyor belt link comprising a base for carrying an item, the base having a first end and a second end, a first linking member attached to the base by a first arm that projects downward from the base at an angle and is offset from the first end, and a second linking member attached to the base by a second arm that projects downward from the base;
    the first end terminating at a first angle relative to a horizontal axis, the second end terminating at a second angle relative to a horizontal axis, the first and second angles being substantially supplementary;
    the first linking member comprising a partial cylinder and the second linking member comprising a channel, wherein the channel is adapted to rotatably couple with a first linking member of an adjacent conveyor belt link;
    wherein the conveyor belt moves relative to the at least one platen and transports a food product to allow the food product to be exposed to the platen.

14. A conveyor belt comprising:
    a plurality of conveyor belt links;
    each conveyor belt link comprising a base for carrying an item, the base having a first end and a second end, a first linking member attached to the base by a first arm that projects downward from the base at an angle and is offset from the first end, and a second linking member attached to the base by a second arm that projects downward from the base;

the first end terminating at a first angle relative to a horizontal axis, the second end terminating at a second angle relative to a horizontal axis, the first and second angles being substantially supplementary;

the first end being undercut and providing a stop surface;

the second end terminating at the second angle providing a rest surface, the rest surface comprising a surface inclined at the second angle, the inclined surface connecting the base and the second linking member;

the first linking member is a partial cylinder and the second linking member is a channel, wherein the channel is adapted to rotatably couple with a first linking member of an adjacent conveyor belt link;

the base for carrying an item having a top receiving surface for carrying an item, wherein the top receiving surface is corrugated or textured for retaining an item to be transported.

15. The conveyor belt according to claim 14, wherein the portion of the cylinder comprises a bore.

16. The conveyor belt according to claim 15, further comprising a plurality of fasteners disposed in the portions of the bores of the cylinder, the fasteners being configured to prevent axial movement between adjacent links.

17. A conveyor belt link for a conveyor belt assembly, comprising:

a base for carrying an item, the base having a first end and a second end, a first linking member attached to the base by a first arm that projects downward from the base at an angle and is offset from the first end, and a second linking member attached to the base by a second arm that projects downward from the base;

the first end terminating at a first angle relative to a horizontal axis, the second end terminating at a second angle relative to the horizontal axis, the first and second angles being substantially supplementary; and the second linking member comprising a partial cylinder and the first linking member comprising a channel, the channel being adapted to rotatably couple with a second linking member of an adjacent conveyor belt link.

18. The conveyor belt link for a conveyor belt assembly according to claim 17, wherein the first end is undercut.

19. The conveyor belt link for a conveyor belt assembly according to claim 18, wherein the undercut of the first end provides a stop surface.

20. The conveyor belt link for a conveyor belt assembly according to claim 17, wherein the second end terminating at the second angle provides a rest surface, the rest surface comprising a surface inclined at the second angle, the inclined surface connecting the base and the second linking member.

* * * * *